(12) United States Patent
Seo et al.

(10) Patent No.: US 11,902,647 B2
(45) Date of Patent: Feb. 13, 2024

(54) CAMERA MODULE AND ELECTRONIC DEVICE INCLUDING THE SAME

(71) Applicant: Samsung Electro-Mechanics Co., Ltd., Suwon-si (KR)

(72) Inventors: Bo Sung Seo, Suwon-si (KR); Young Bok Yoon, Suwon-si (KR); Nam Ki Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 231 days.

(21) Appl. No.: 17/350,043

(22) Filed: Jun. 17, 2021

(65) Prior Publication Data

US 2022/0070341 A1 Mar. 3, 2022

(30) Foreign Application Priority Data

Sep. 2, 2020 (KR) .......................... 10-2020-0111467

(51) Int. Cl.
 *H04N 23/55* (2023.01)
 *H04N 23/51* (2023.01)
 *H04N 23/54* (2023.01)
 *H04N 23/68* (2023.01)

(52) U.S. Cl.
 CPC ............. *H04N 23/55* (2023.01); *H04N 23/51* (2023.01); *H04N 23/54* (2023.01); *H04N 23/687* (2023.01)

(58) Field of Classification Search
 CPC ........ H04N 23/51; H04N 23/54; H04N 23/55; H04N 23/57; H04N 23/687
 See application file for complete search history.

(56) References Cited

U.S. PATENT DOCUMENTS

| 5,822,122 A | * | 10/1998 | Kuno ...................... G03B 5/00 |
| | | | 359/557 |
| 2005/0276172 A1 | * | 12/2005 | Tsutsumi ............... H04N 23/68 |
| | | | 369/44.14 |
| 2015/0002683 A1 | | 1/2015 | Hu et al. |
| 2016/0241786 A1 | | 8/2016 | Minamisawa |
| 2018/0275366 A1 | * | 9/2018 | Cheng ................... G02B 7/023 |
| 2018/0367714 A1 | | 12/2018 | Im et al. |
| 2021/0250475 A1 | * | 8/2021 | Jeong ..................... H04N 23/57 |

FOREIGN PATENT DOCUMENTS

| JP | 2007-41455 A | 2/2007 |
| JP | 2015-11353 A | 1/2015 |
| KR | 10-0624988 B1 | 12/2006 |
| KR | 10-2016-0063329 A | 6/2016 |
| KR | 10-2018-0137277 A | 12/2018 |
| KR | 10-2009197 B1 | 8/2019 |
| KR | 10-2146385 B1 | 8/2020 |

OTHER PUBLICATIONS

Korean Office Action dated Aug. 9, 2021 in counterpart Korean Patent Application No. 10-2020-0111467 (8 pages in English and 6 pages in Korean).

\* cited by examiner

*Primary Examiner* — Amy R Hsu

(74) *Attorney, Agent, or Firm* — NSIP Law

(57) ABSTRACT

A camera module is provided. The camera module includes a housing; a first frame, provided in the housing; and a second frame, provided on the first frame and including a lens module, wherein the lens module is configured to rotate together with the second frame about a first axis and a second axis, intersecting an optical axis, and , wherein the first frame and the second frame are configured to be supported on a surface that is parallel to the optical axis.

21 Claims, 15 Drawing Sheets

CAMERA MODULE AND ELECTRONIC DEVICE INCLUDING THE SAME

CROSS-REFERENCE TO RELATED APPLICATION(S)

This application claims the benefit under 35 USC § 119(a) of Korean Patent Application No. 10-2020-0111467 filed on Sep. 2, 2020, in the Korean Intellectual Property Office, the entire disclosure of which is incorporated herein by reference for all purposes.

BACKGROUND

1. Field

The following description relates to a camera module and an electronic device including the same.

2. Description of Related Art

Micro-camera modules have been employed in mobile communication terminal devices (electronic devices) such as, but not limited to, smartphones, tablet personal computers (PCs), laptops, and the like.

As mobile communication terminal devices have been implemented with reduced sizes, the image quality may deteriorate due to the occurrence of hand-shake during the imaging of an object. Therefore, a technique for correcting hand-shake may be necessary to obtain a clear image.

When hand-shake occurs during the imaging of an object, an optical image stabilization (OIS) actuator to which an OIS technique is applied may be used to correct the hand-shake. An OIS actuator may move a lens module in a direction perpendicular to an optical axis.

However, since shaking that occurs in the camera module may not always occur in a direction that is perpendicular to the optical axis, there may be a limit to shaking correction when the lens module is moved in a direction perpendicular to the optical axis.

Furthermore, a typical shake correction module (an OIS module) of cameras may prevent relatively minor hand-shake by moving the lens module horizontally in a plurality of directions, perpendicular to the optical axis. There may be a limit that the typical shake correction module corrects continuous shaking occurring during video recording.

Additionally, since typical shake correction modules (an OIS module) of cameras may prevent relatively small hand-shake by horizontally moving the lens module in a plurality of directions, perpendicular to the optical axis, there may be a limit to implementing the shake correction or tracking function, which is an additional function for video recording, in the typical shake correction module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a housing; a first frame, provided in the housing; and a second frame, provided on the first frame, and including a lens module, wherein the lens module is configured to rotate together with the second frame about a first axis and a second axis, intersecting an optical axis, and wherein the first frame and the second frame are configured to be supported on a surface that is parallel to the optical axis.

The first frame may be configured to rotate with respect to the housing about the first axis which is formed by a rotational axis ball, and wherein the second frame may be configured to rotate with respect to the first frame about the second axis which is formed by two ball members.

The rotational axis ball and the two ball members may be aligned in a second axis direction, when viewed in a first axis direction.

The first axis and the second axis intersect, and the rotational axis ball and the two ball members may be arranged to be configured together on a plane in which the first axis and the second axis are configured.

An intersection of the first axis and the second axis may intersect the optical axis.

The first frame may be supported in the housing by the rotational axis ball and at least two guide balls.

The housing and the second frame may be respectively configured with a first magnetic body and a second magnetic body, and wherein the second frame may be supported in the housing by an attraction force of the first magnetic body and an attraction force of the second magnetic body.

The first frame may be configured with one of a through-hole or a through-groove to directly oppose the second magnetic body provided in the second frame and the first magnetic body.

The first frame may be supported in the housing by a rotational axis ball and at least two guide balls, and wherein a center of attraction formed between the first magnetic body and the second magnetic body is provided inside a largest triangle formed by using the rotational axis ball and the at least two guide balls as vertices.

The rotational axis ball and the two ball members may be configured to rotate in place or maintain a fixed state.

The first axis and the second axis may intersect in a vertical direction, when viewed in an optical axis direction.

The second frame may include an image sensor provided below the lens module, and wherein the image sensor may be configured to rotate together with the lens module.

In a general aspect, a camera module includes a first frame, supported on one surface of a housing; and a second frame, including a lens module, and supported by the first frame in a direction facing the one surface, wherein the first frame is configured to rotate around an axis perpendicular to the one surface and perpendicular to an optical axis, wherein the second frame is configured to rotate around an axis parallel to the one surface and perpendicular to the optical axis, and wherein the first frame is configured to rotate in a state in which only one side of the first frame is supported.

The camera module may be configured to rotate in a state in which only one side is supported by a rotational axis ball that forms a first axis between the one surface and the first frame, and wherein the camera module may be configured to rotate in a state in which two sides of the camera module are supported by two ball members that form a second axis between the first frame and the second frame.

The housing may include a first housing and a second housing, and wherein the one surface is one side surface of the first housing, and the second housing may be coupled to the first housing on a side opposing one surface of the first housing.

The camera module may include a plurality of coils configured to drive the first frame and the second frame, wherein the plurality of coils may be divided and provided in the first housing and the second housing.

In a general aspect, a portable electronic device includes a plurality of cameras, wherein the plurality of cameras include a plurality of camera modules configured to have different angles of view, and wherein at least one camera module of the plurality of camera modules, is the camera module of claim 1.

In a general aspect, an electronic device includes one or more camera modules, each of the one or more camera modules including a shake correction unit, including a first frame, supported on a housing, and configured to rotate about a first axis perpendicular to an optical axis; a second frame, supported on the first frame, and configured to rotate about a second axis perpendicular to the first axis and the optical axis; and a lens module, provided in the second frame, and configured to rotate with the second frame.

The first frame may be supported on the housing by a rotational axis ball and at least two guide balls.

The rotational axis ball may be fixed to one of the housing and the first frame.

Opposing sides of the second frame may be supported on the first frame by two ball members.

Other features and aspects will be apparent from the following detailed description, the drawings, and the claims.

Figure 1:
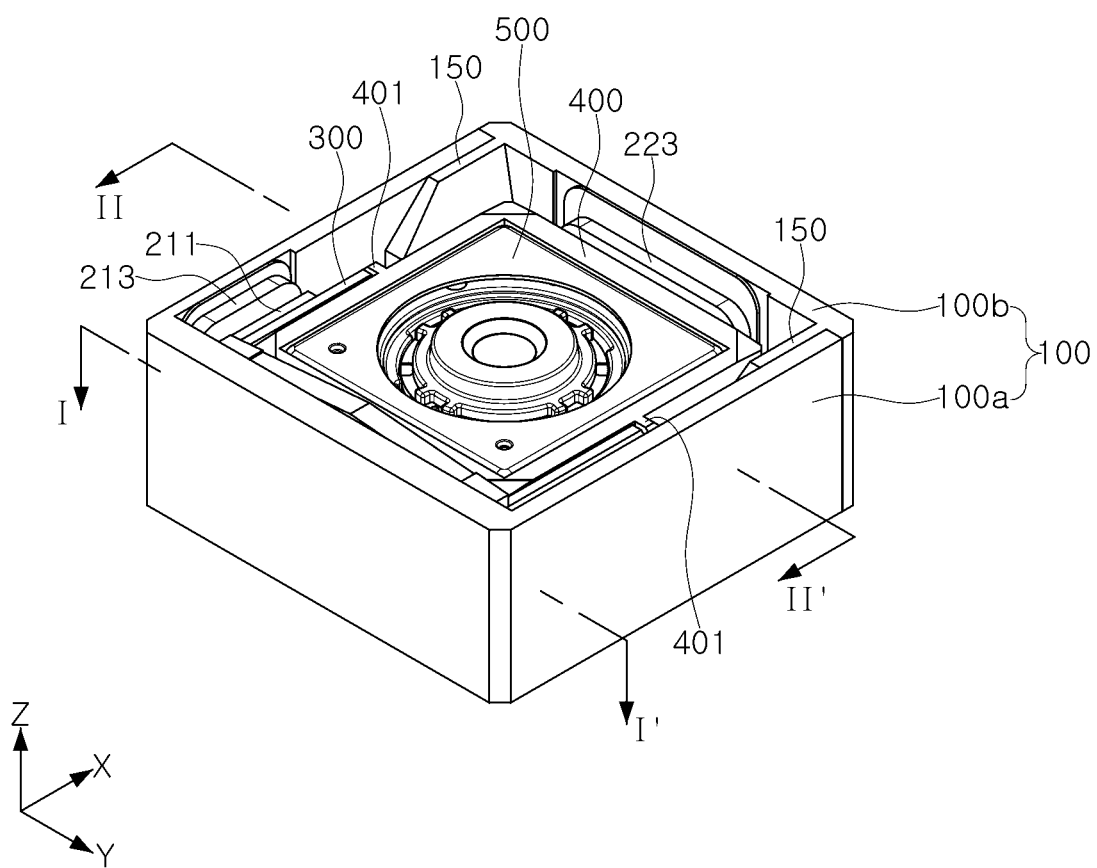
FIG. 1 is a combined perspective view illustrating an example camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

The present disclosure relates to a lens driving device, and a camera module including the same, and the camera module may be applied to portable electronic devices such as, but not limited to, mobile communication terminals, smartphones, tablet PCs, and the like.

The camera module may be an optical device that captures an image or a video, and may include a lens that refracts light reflected from an object, and a lens driving device which may move the lens to adjust a focus or to correct shake.

Figure 2:
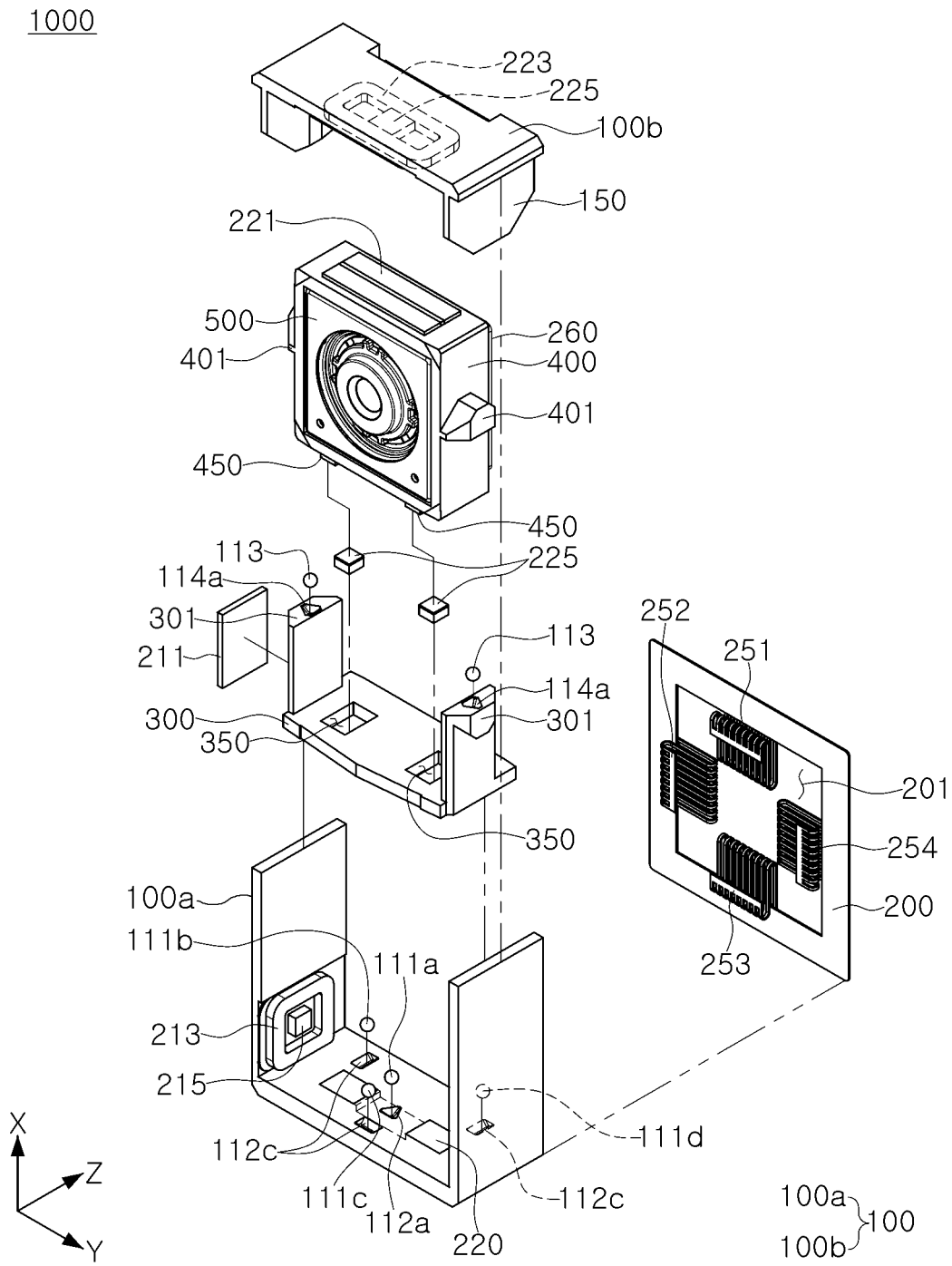
FIG. 2 is an exploded perspective view illustrating an example camera module, in accordance with one or more embodiments.

FIG. 1 is a combined perspective view illustrating an example camera module, in accordance with one or more embodiments, and FIG. 2 is an exploded perspective view illustrating an example camera module, in accordance with one or more embodiments.

Referring to FIGS. 1 and 2, a camera module 1000, in accordance with one or more embodiments, may include a shake correction module provided in a housing 100, and the shake correction module may include an automatic focus adjustment module provided therein.

The shake correction module (or a rotation module, hereinafter, referred to as a shake correction module for convenience of description) may be implemented with a first frame 300, a second frame 400 and a shake correction actuator, provided in the housing 100. In this example, the first frame 300 and the second frame 400 may be a shake correction unit, (or a rotation module unit, hereinafter, referred to as a shake correction unit for convenience of description), which implements shake correction operations or functions, (or tracking operations or functions2), by rotation in an internal space formed by the housing 100.

In other words, the shake correction unit constituting a moving unit may include a lens module and an image sensor, and the moving unit (e.g., the shake correction unit, the lens module, the image sensor) may rotate relative to a fixed unit including the housing.

Further, the automatic focus adjustment module may be implemented with a lens module 500 provided in the second frame 400, and the lens module 500 may include an actuator that implements automatic focus adjustment.

In this example, since the automatic focus adjustment module may be provided in the shake correction module, in a process of implementing the shake correction, a driving unit that implements the automatic focus adjustment module (e.g., various automatic focus adjustment actuators such as an actuator including a coil and a magnet, a piezoelectric actuator, a shape memory alloy (SMA) actuator, or the like) may move together with the image sensor. Therefore, in this example, a structure of a connection substrate 250 for supplying power and transmitting control signals to an automatic focus adjustment actuator and an image sensor 261 may be beneficial.

Hereinafter, the shake correction module will be described in detail, and the structure of the connection substrate 250 connected to the automatic focus adjustment module provided in the shake correction module will be described.

Figure 3:
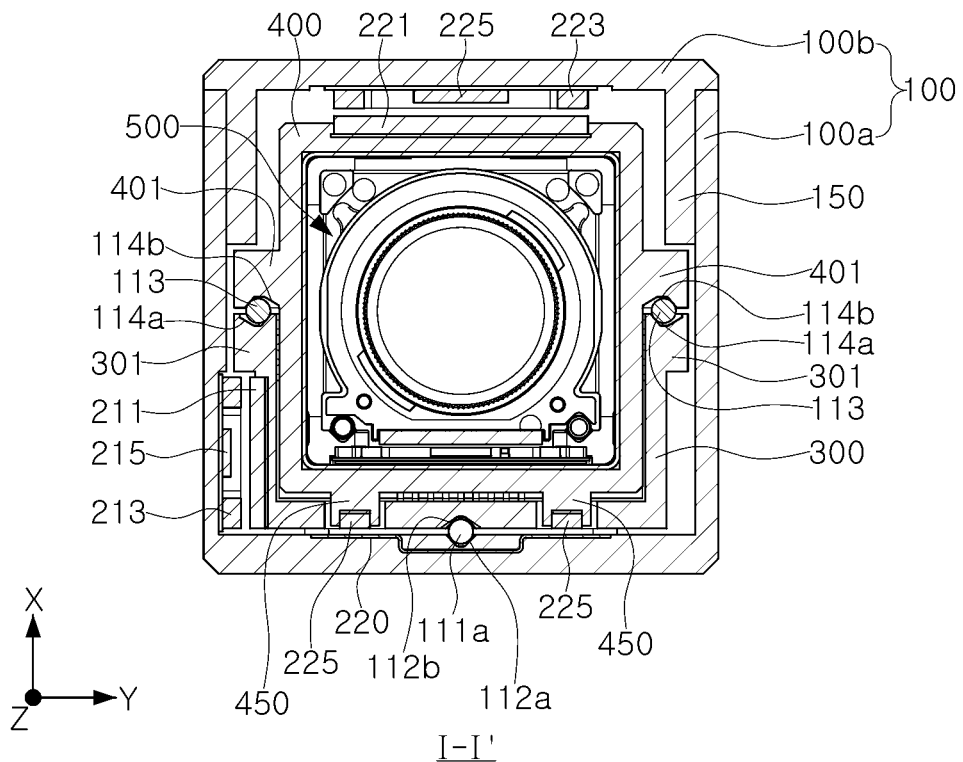
FIG. 3 is a cross-sectional perspective view of the camera module of FIG. 1 taken along line I-I'.
Figure 4:
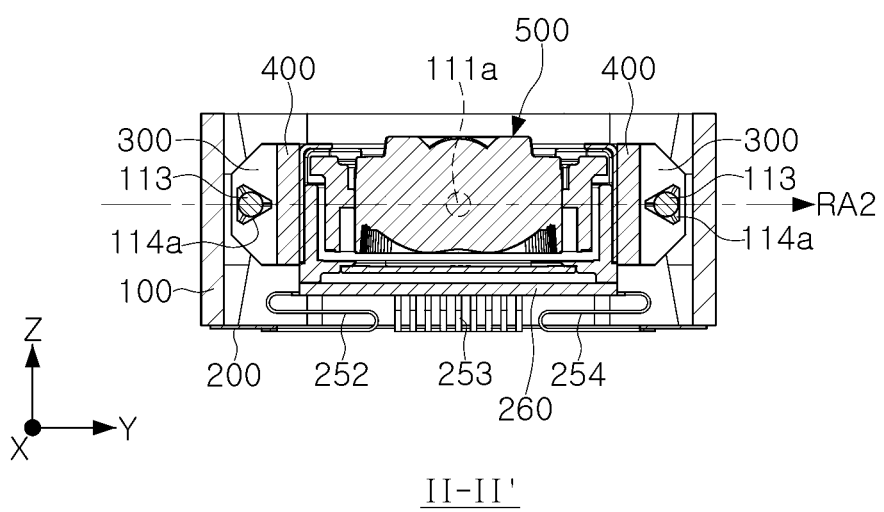
FIG. 4 is a cross-sectional perspective view of the camera module of FIG. 1 taken along line II-II'.
Figure 5A:
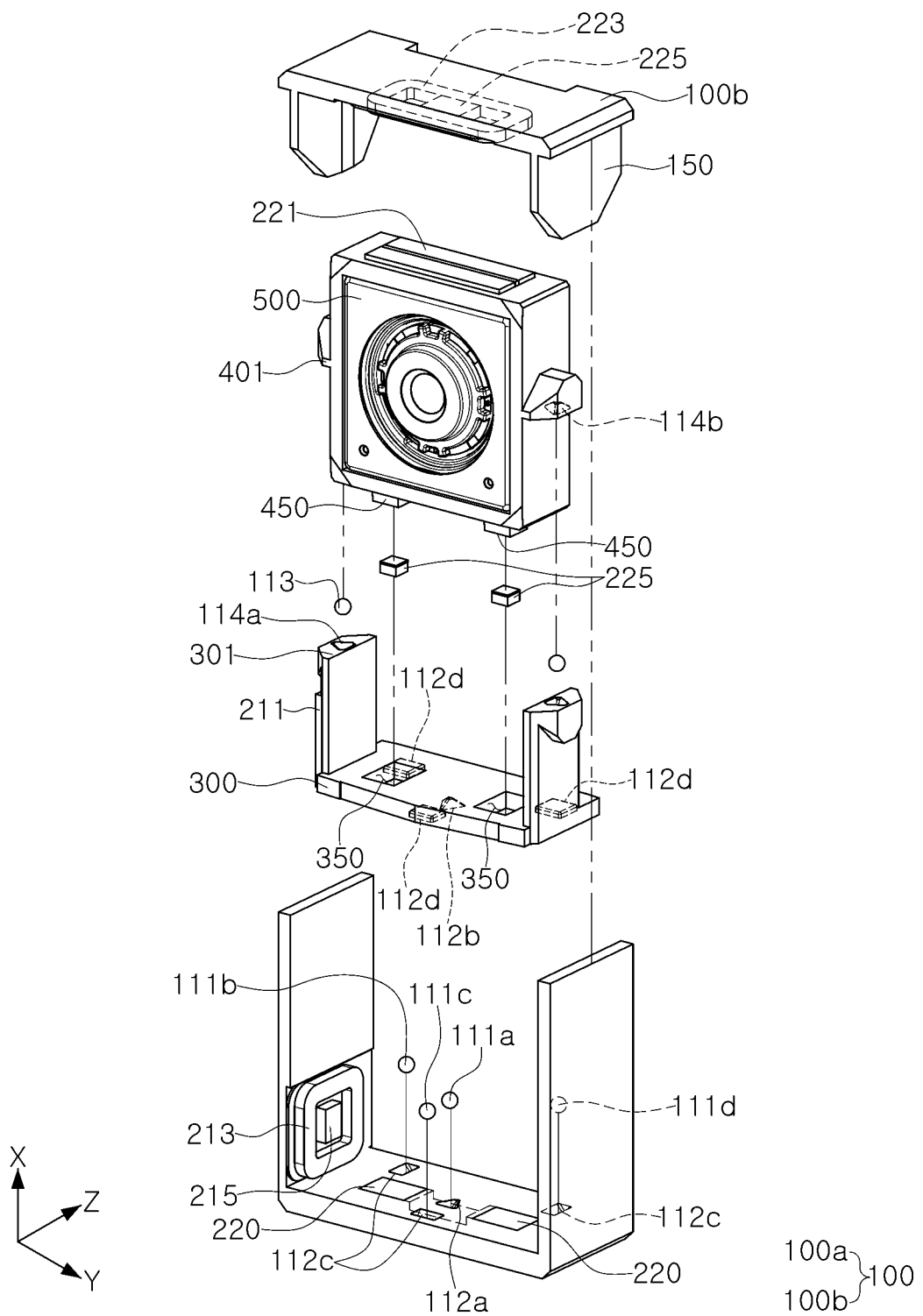
FIG. 5A is an exploded perspective view illustrating a main portion of an example camera module, in accordance with one or more embodiments.
Figure 5B:
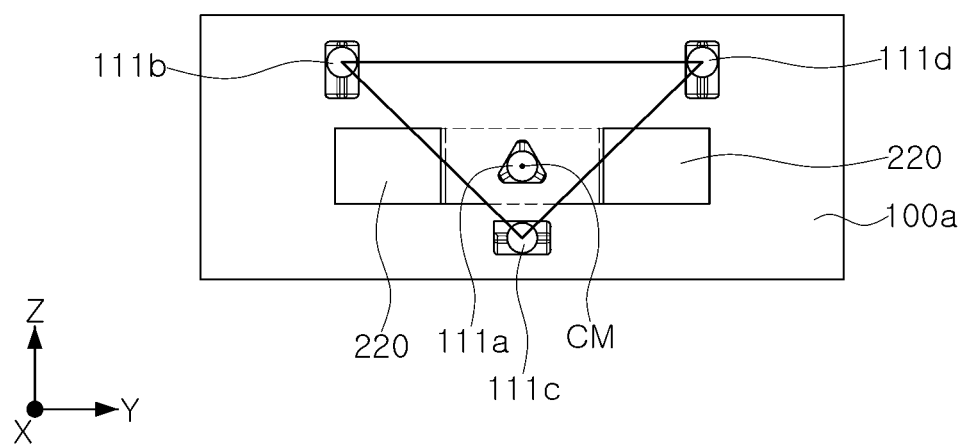
FIG. 5B is a plan view of FIG. 5A illustrating one surface of the housing in which the first frame is supported.
Figure 6A:
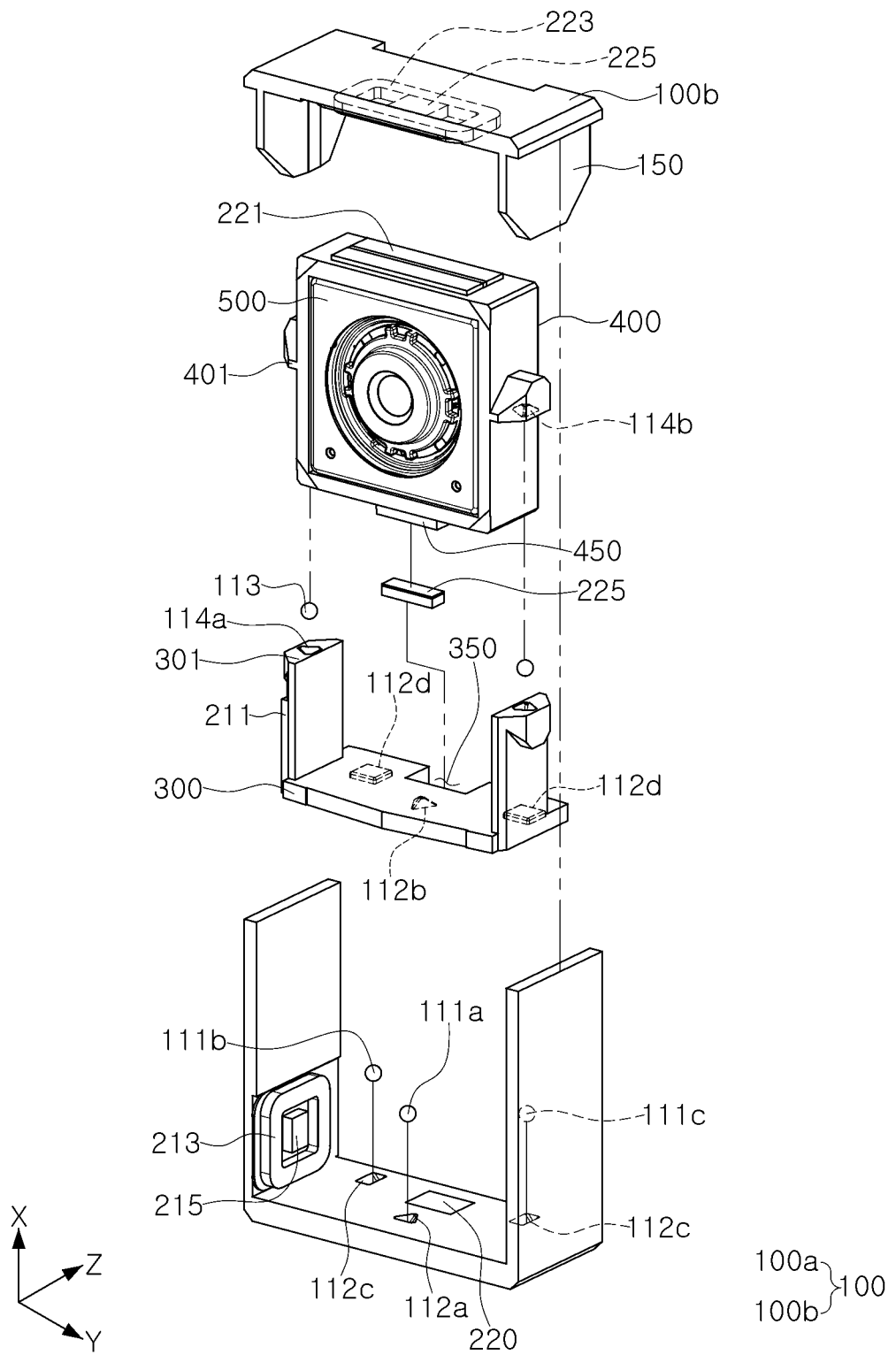
FIG. 6A is an exploded perspective view of a main portion of an example camera module, in accordance with one or more embodiments.
Figure 6B:
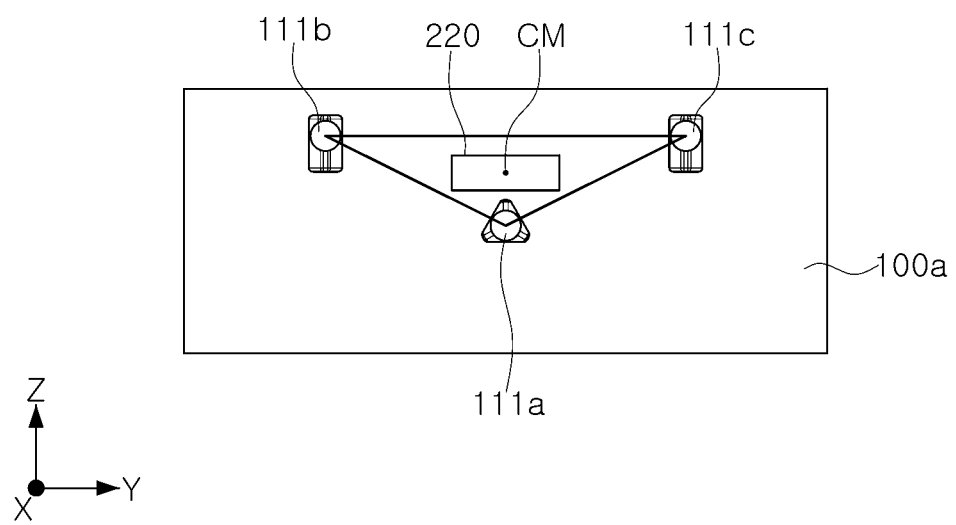
FIG. 6B is a plan view of FIG. 6A illustrating one surface of the housing in which the first frame is supported.
Figure 7:
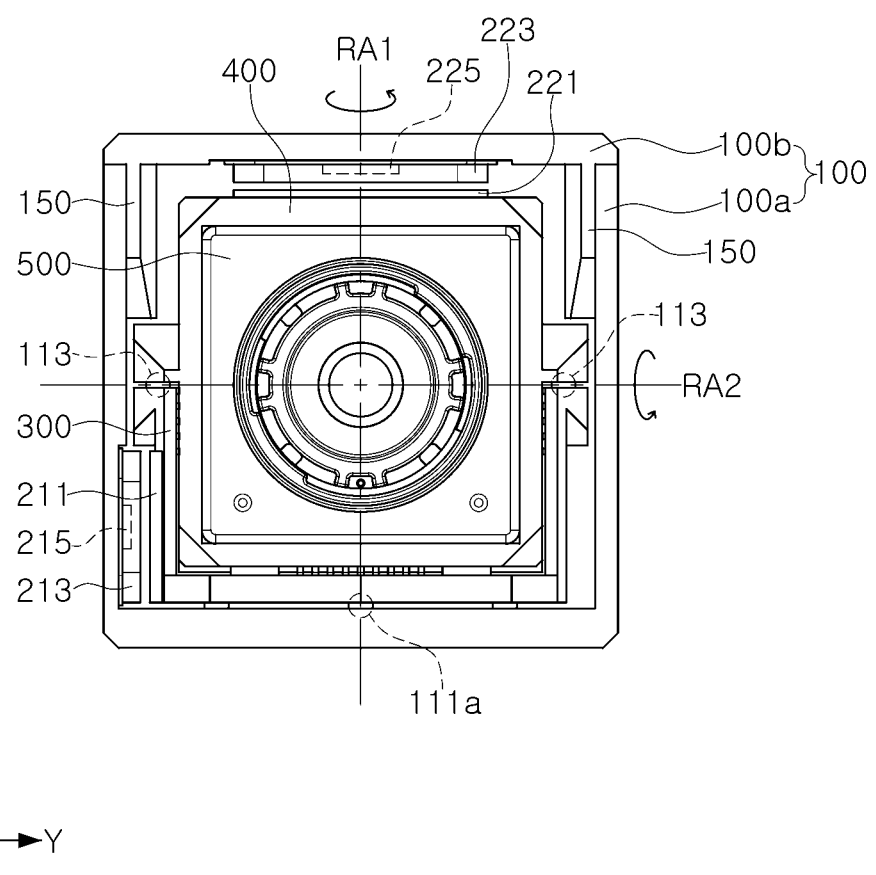
FIG. 7 is a plan view illustrating a rotational axis of an example camera module, in accordance with one or more embodiments.
Figure 8:
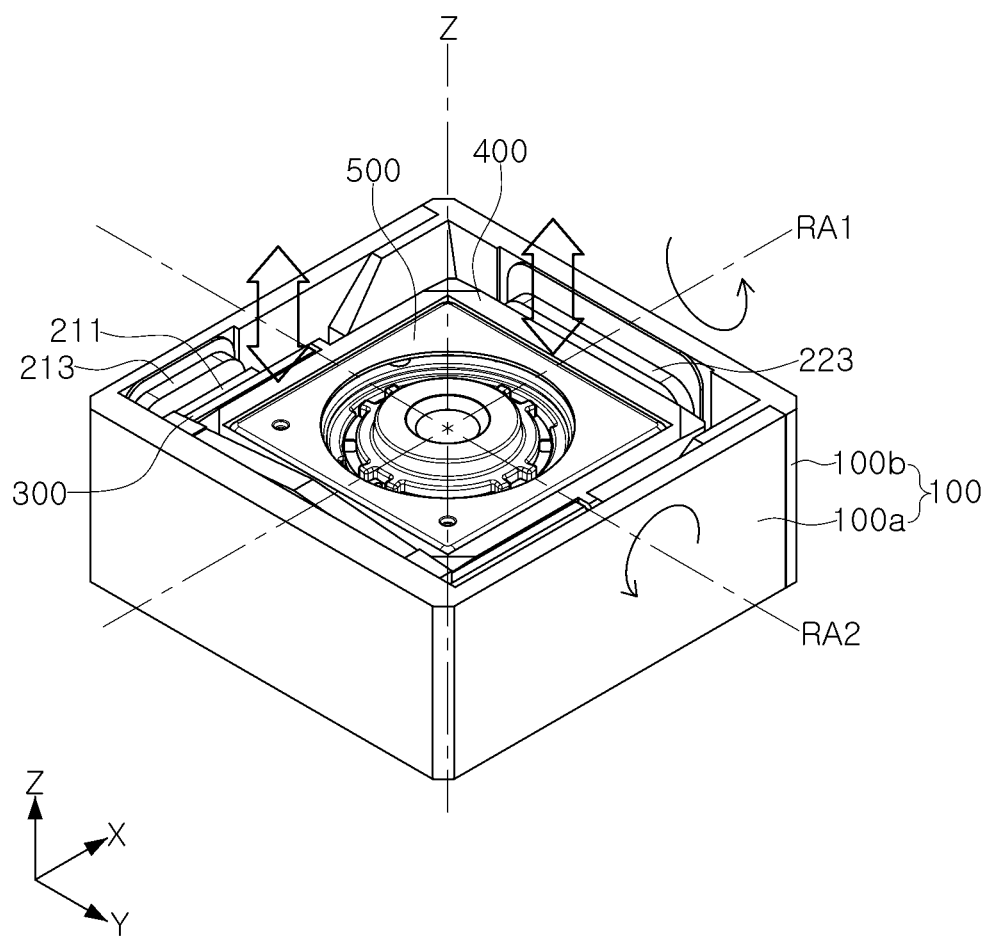
FIG. 8 is a perspective view illustrating a driving unit for rotation of an example camera module, in accordance with one or more embodiments.

FIG. 3 is a cross-sectional perspective view of the camera module of FIG. 1 taken along line I-I'. FIG. 4 is a cross-sectional perspective view of the camera module of FIG. 1 taken along line II-II'. FIG. 5A is an exploded perspective view illustrating a main portion of an example camera module, in accordance with one or more embodiments. FIG. 5B is a plan view of FIG. 5A illustrating one surface of the housing in which the first frame is supported. FIG. 6A is an exploded perspective view of a main portion of an example camera module, in accordance with one or more embodiments. FIG. 6B is a plan view of FIG. 6A illustrating one surface of the housing in which the first frame is supported. FIG. 7 is a plan view illustrating a rotational axis of an example camera module, in accordance with one or more embodiments. FIG. 8 is a perspective view illustrating a driving unit for rotation of an example camera module, in accordance with one or more embodiments.

Referring to FIGS. 3 to 8, a shake correction module of an example camera module 1000 may include a housing 100, a first frame 300, and a second frame 400, provided in the housing 100.

The first frame 300 may rotate about a first axis with respect to the housing 100, and the second frame 400 may rotate about a second axis with respect to the first frame 300. The first axis and the second axis may intersect (or vertically intersect) each other, and the first axis and the second axis may intersect (or vertically intersect) an optical axis.

Additionally, the first frame 300 may rotate with respect to the housing 100, and the second frame 400 may rotate with respect to the first frame 300, by being connected to form a rotational axis in various ways such as a ball member, an elastic member (a spring, an elastic rod, or the like), or by a virtual rotational axis.

Referring to FIGS. 7 and 8, a first rotational axis RA1 may be formed by one (1) first ball member disposed in a direction intersecting the optical axis direction, between the housing 100 and an opposite surface of the first frame 300 in a direction intersecting the optical axis direction (more specifically, perpendicular to the optical axis direction), and a second rotational axis RA2 may be formed by two (2) second ball members disposed in a direction perpendicular to the optical axis and intersecting the first rotational axis, between the first frame 300 and an opposite surface of the second frame 400 in a direction intersecting the optical axis direction (more specifically, perpendicular to the optical axis direction).

The first frame 300 may rotate about the first rotational axis RA1 intersecting or perpendicular to the optical axis (the Z-axis), and the second frame 400 may rotate about the second rotational axis RA2 intersecting or perpendicular to the optical axis (the Z-axis) and the first rotational axis RA1.

In this example, the first rotational axis (the X-axis) may refer to an axis perpendicular to the optical axis (the Z-axis), and the second rotational axis (the Y-axis) may refer to an axis perpendicular to the optical axis (the Z-axis) and the first rotational axis (the X-axis). Additionally, the first rotational axis (the X-axis) and the second rotational axis (the Y-axis) of the first camera module 1000 may intersect the optical axis (the Z-axis), and the optical axis (the Z-axis), the first rotational axis (the X-axis), and the second rotational axis (the Y-axis) may meet at approximately any one point.

The housing 100 may include a first housing 100a and a second housing 100b, that form an internal space by mutually coupling thereof. Further, a cover (not illustrated) may be provided on an upper portion of the housing 100 to cover the internal space, and an incident hole through which light may be incident may be provided in the cover.

In a non-limiting example, the housing 100 may have a shape in which upper and lower portions are opened by a combination of the first housing 100a and the second housing 100b. Additionally, a lens module 500 may be exposed from the open upper portion of the housing 100, and a sensor substrate 260 on which the image sensor 261 in which light incident on the lens module 500 is formed as an image is mounted may be exposed from the open lower portion of the housing 100. The upper portion of the housing 100 may be covered with the cover (not illustrated), and a main substrate 200 may be coupled to the lower portion of the housing 100.

Further, the first frame 300 may be provided to be supported on an inner surface of the housing 100, and the second frame 400 may be provided to be supported on one surface of the first frame 300. In this case, the one surface of the first frame 300 may be supported by the housing 100, and the second frame 400 may be supported on a surface of the first frame 300, opposing the one surface of the first frame 300.

Therefore, the housing 100 and the second frame 400 may be each selectively provided with a first magnetic body 220 and a second magnetic body 225, and the second frame 400 may be pulled toward the housing 100 by attraction of the first magnetic body 220 and the second magnetic body 225, with the first frame 300 interposed between the housing 100 and the second frame 400.

In this example, the first frame 300 and the second frame 400 may be pulled toward a surface of the housing 100, parallel to the optical axis direction. Therefore, the first magnetic body 220 and the second magnetic body 225 may be mutually pulled in a direction, perpendicular to the optical axis.

In this embodiment, it is described as an example in which force pulled by the magnetic bodies provided in the housing 100 and the second frame 400 acts. This embodiment may also include examples in which a magnetic material may be provided in the housing 100, the first frame 300, and the second frame 400, respectively, and the magnetic material may form a force that is pulled between the housing 100 and the first frame 300 or between the first frame 300 and the second frame 400, respectively.

The first magnetic body 220 and the second magnetic body 225 may be provided to oppose each other in a direction, perpendicular to the optical axis direction.

In this example, the first magnetic body 220 or the second magnetic body 225 may be a magnetic substance or a magnetic material, and may be a material having magnetism, for example, a material that may be magnetized in a magnetic field (including both a metal or a non-metal material). The first magnetic body 220 or the second magnetic body 225 may be an attractive magnet or an attractive yoke.

In an example, when the first magnetic body 220 is an attractive magnet, the second magnetic body 225 may be an attractive yoke or an attractive magnet. Additionally, when the first magnetic body 220 is an attractive yoke, the second magnetic body 225 may be an attractive magnet. Hereinafter, for convenience of explanation, an embodiment in which an attractive yoke 220 is provided in the housing 100 and an attractive magnet 225 is provided in the second frame 400 will be described.

Since the second frame 400 may be pulled to the housing 100 by attraction of the attractive yoke 220 and the attractive magnet 225, separation of the first frame 300 or the second frame 400 may be prevented.

Additionally, this example may be configured to have the attractive yoke 220 and the attractive magnet 225, to exert effects that the lens module 500 may be fixed to a predetermined position by their attraction even when power is not applied, and may thus maintain a horizontal state.

The first magnetic body 220 and the second magnetic body 225 may be provided on an axis, perpendicular to the optical axis. Specifically, the first magnetic body 220 and the second magnetic body 225 may be provided to have a suction force in a direction of the first rotational axis RA1, perpendicular to the optical axis.

The first magnetic body 220 and the second magnetic body 225 may be provided at predetermined intervals on the first rotational axis RA1.

The first frame 300 may be closely supported by at least inserting one (1) first ball member 111 between the housing 100 and the first frame 300, and the first frame 300 may be rotatably driven by a first driving unit. The first driving unit may be provided with various actuators such as an actuator including a coil and a magnet, a piezoelectric actuator, a shape memory alloy (SMA) actuator, or the like.

The first driving unit may include a first magnet 211 and a first coil 213, which may be selectively provided to oppose the housing 100 and the first frame 300, respectively. Additionally, the housing 100 and the first frame 300 may be provided with a position detection sensor 215, which is provided to oppose the first magnet 211, to sense a rotation amount of the first frame 300. The position detection sensor 215 may be, as examples, a Hall sensor, a magnetic sensor, or the like.

The first driving unit may be provided on a surface (not illustrated) on which a rotational axis ball 111a described below is provided, or on a surface intersecting or perpendicular to the above surface. Additionally, the first driving unit may be provided as close as possible to a surface on which the rotational axis ball 111a is provided, among a surface (a second surface) intersecting or perpendicular to a surface (a first surface) on which the rotational axis ball 111a is provided. In an example, the first driving unit may be provided as close as possible to a corner at which the first and second surfaces meet.

At least three first ball members 111 may be provided between a side surface of the housing 100, for example, a surface of the housing 100 parallel to the optical axis direction, and the first frame 300. For example, the first ball member 111 may be provided to include a rotational axis ball 111a forming a rotational axis of the first frame 300, and a plurality of guide balls assisting rotation of the first frame 300.

In an example, the first frame 300 may rotate in a state in which only one side is supported by the rotational axis ball 111a forming the first rotational axis, between one surface of the housing 100 and the first frame 300, and the second frame 400 may rotate in a state in which both sides are supported by two (2) ball members 113 forming the second rotational axis between the first frame 300 and the second frame 400.

Referring to FIGS. 5A and 5B, the first ball member 111 may include three (3) guide balls, 111a, 111b, and 111c, and may be provided as four (4) in total, including guide ball 111*d*, and referring to FIGS. 6A and 6B, the first ball member 111 may include two (2) guide balls, 111*a* and 111*b*, and may be provided as three (3) in total, including guide ball 111*c*. First, a description will be made with reference to FIG. 5A, and then with reference with FIG. 6A.

Referring to FIGS. 5A and 5B, a rotational axis ball 111*a*, which may be one of the first ball members 111, including 111*a*, 111*b*, 111*c*, and 111*d*, may form the first rotational axis RA1, which may be a rotational axis in which the first frame 300 rotates with respect to the housing 100, and guide balls 111*b*, 111*c*, and 111*d*, which may be other ball members thereamong, may facilitate rotation of the first frame 300.

In this example, the rotational axis ball 111*a*, which forms the first rotational axis RA1, may be located inside a triangle connecting the three (3) guide balls 111*b*, 111*c*, and 111*d*, and may be located, in more detail, in a center of geometry or gravity in the triangle. Additionally, the rotational axis ball 111*a* may be provided on the same plane as the triangle connecting the three (3) guide balls 111*b*, 111*c*, and 111*d*.

As illustrated in FIG. 5B, a center CM of the first magnetic body 220 (e.g., a center of geometry or magnetic force) may be located inside a triangle connecting the three (3) guide balls 111*b*, 111*c*, and 111*d*. Therefore, the first frame 300 may be supported in at least three (3) positions by the three guide balls 111*b*, 111*c*, and 111*d*, while maintaining a stable state on a side surface of the housing 100.

Additionally, in an example, as illustrated in FIGS. 2 and 5B, the first magnetic body 220 may be provided to be elongated in one direction (in FIG. 5B, in an integrated type in which both solid line portions indicated by reference numeral 220 and a dotted line portion therebetween are all connected), the first magnetic body 220 may be provided as a plurality of first magnetic bodies, and the plurality of first magnetic bodies may be sequentially arranged in the one direction (in FIG. 5B, two (2) solid line portions indicated by reference numeral 220), but the center CM of magnetic force of the first magnetic body 220 may be located inside a triangle connecting the three (3) guide balls 111*b*, 111*c*, and 111*d*. The first magnetic body 220 may be attached to the housing 100 by an adhesive or the like, or may be inserted and injected together while injecting the housing 100.

Since the rotational axis ball 111*a* should form a rotational axis, a position of the rotational axis ball 111*a* may not be changed and may be rotated or fixed in place by itself while being fixed in one place. Therefore, the first frame 300 may rotate about the rotational axis ball 111*a*.

The guide balls 111*b*, 111*c*, and 111*d* may be provided at a position, other than the rotational axis, to guide the rotation of the first frame 300, and may thus be provided to have a rolling or sliding movement. Therefore, the first frame 300 may be guided by the rolling or sliding movement of the guide balls 111*b*, 111*c*, and 111*d*.

Therefore, a guide portion into which the rotational axis ball 111*a* is inserted may be provided on an inner surface of the housing 100 and one surface of the first frame 300.

A first guide portion 112*a* may be provided in the housing 100, and a second guide portion 112*b* may be provided in the first frame 300, such that the rotational axis ball 111*a* is inserted in the guide portions 112*a* or 112*b*. Since the rotational axis ball 111*a*, which may be spherical, should not be moved, at least one of the first guide portion 112*a* and the second guide portion 112*b* may be supported by the rotational axis ball 111*a* in at least three (3) positions.

In an example, at least one of the first guide portion 112*a* and the second guide portion 112*b* may be provided to have a shape in which each corner is cut in a triangular pyramid (tetrahedron) shape.

Alternatively, the rotational axis ball 111*a* may be fixedly provided to either the housing 100 or the first frame 300, and the rotational axis ball 111*a* may be provided with a guide portion that does not move to the other one of the housing 100 or the first frame 300.

The housing 100 may be provided with a third guide portion 112*c*, and the first frame 300 may be provided with a fourth guide portion 112*d*, such that the guide balls 111*b*, 111*c*, and 111*d* are inserted. Since the guide balls 111*b*, 111*c*, and 111*d*, which may be spherical, are preferably moved in position, the third guide portion 112*c* and the fourth guide portion 112*d* may be provided to be elongated in the rotational direction of the first frame 300.

In this example, one of the third guide portion 112*c* and the fourth guide portion 112*d* may be provided in a straight line or curved shape in a substantially rotational direction, and the other one thereof may be provided to have a relative width for rolling flowability of the guide ball. In FIG. 5A, the third guide portion 112*c* may be provided to be elongated in a longitudinal direction in the rotational direction of the first frame 300, and the fourth guide portion 112*d* may be provided to be elongated in a longitudinal direction in the rotational direction of the first frame 300, and may have a width wider than that of the third guide portion 112*c*, to provide rolling flowability of the guide ball.

Referring to FIGS. 6A and 6B, a rotational axis ball 111*a*, which may be one of the first ball members 111, including 111*a*, 111*b*, 111*c*, and 111*d*, may form the first rotational axis RA1, which may be a rotational axis in which the first frame 300 rotates with respect to the housing 100, and guide balls 111*b* and 111*c*, which may be other ball members thereamong, may facilitate rotation of the first frame 300.

In an example, the first frame 300 may rotate in a state in which only one side is supported by the rotational axis ball 111*a* that forms the first rotational axis, between one surface of the housing 100 and the first frame 300, and the second frame 400 may rotate in a state in which both sides are supported by two (2) ball members 113 forming the second rotational axis between the first frame 300 and the second frame 400.

In this example, when the rotational axis ball 111*a* that forms the first rotational axis RA1 and the two guide balls 111*b* and 111*c* are connected, a triangle may be formed.

As illustrated in FIG. 6B, a center CM of the first magnetic body 220 (e.g., a center of geometry or magnetic force) may be located inside a triangle connecting the three (3) guide balls 111*a*, 111*b*, and 111*c*. Therefore, the first frame 300 may be supported in at least three (3) positions while maintaining a stable state on a side surface of the housing 100.

The first magnetic body 220 may be attached or coupled to the housing 100 by an adhesive or the like, or may be inserted and injected together while injecting the housing 100.

Since the rotational axis ball 111*a* should form a rotational axis, a position of the rotational axis ball 111*a* may not be changed and may be rotated or fixed in place while being fixed in one place. Therefore, the first frame 300 may rotate about the rotational axis ball 111*a*.

The guide balls 111*b* and 111*c* may be provided at a position, other than the rotational axis, to guide the rotation of the first frame 300, and may thus be provided to have a rolling or sliding movement. Therefore, the first frame 300 may be guided by the rolling or the sliding movement of the guide balls 111*b* and 111*c*.

Therefore, a guide portion (e.g., a guide portion and the like) into which the rotational axis ball 111*a* is inserted may be provided on an inner surface of the housing 100 and one surface of the first frame 300.

A first guide portion 112a may be provided in the housing 100 such that the rotational axis ball 111a is inserted, and a second guide portion 112b may be provided in the first frame 300. Since the rotational axis ball 111a, which may be spherical, may not be moved, at least one of the first guide portion 112a and the second guide portion 112b may be supported by the rotational axis ball 111a in at least three (3) positions.

In an example, at least one of the first guide portion 112a and the second guide portion 112b may be provided to have a shape in which each corner is cut in a triangular pyramid (tetrahedron) shape.

Alternatively, the rotational axis ball 111a may be fixedly provided to either the housing 100 or the first frame 300, and the rotational axis ball 111a may be provided with a guide portion that does not move to the other one of the housing 100 or the first frame 300.

The housing 100 may be provided with a third guide portion 112c, and the first frame 300 may be provided with a fourth guide portion 112d, such that the guide balls 111b and 111c are inserted. Since the guide balls 111b and 111c, which may be spherical, are preferably moved in position, the third guide portion 112c and the fourth guide portion 112d may be provided to be elongated in the rotational direction of the first frame 300.

In this example, one of the third guide portion 112c and the fourth guide portion 112d may be provided in a straight line or curved shape in a substantially rotational direction, and the other one thereof may be provided to have a relatively width for rolling flowability of the guide ball. In FIG. 6A, the third guide portion 112c may be provided to be elongated in a longitudinal direction in the rotational direction of the first frame 300, and the fourth guide portion 112d may be provided to be elongated in a longitudinal direction in the rotational direction of the first frame 300, and may have a width wider than that of the third guide portion 112c, to provide rolling flowability of the guide ball.

The second frame 400 may be closely supported by at least inserting two (2) second ball members 113 between the first frame 300 and the second frame 400, and the second frame 400 may be rotatably driven by a second driving unit. The second driving unit may be provided with various actuators such as an actuator including a coil and a magnet, a piezoelectric actuator, a shape memory alloy (SMA) actuator, or the like.

The second driving unit may include a second magnet 221 and a second coil 223, which are selectively provided to oppose the housing 100 and the second frame 400, respectively. Additionally, the housing 100 and the second frame 400 may be provided with a position detection sensor 225 provided to oppose the second magnet 221, to sense a rotation amount of the second frame 400. The position detection sensor 225 may be, as non-limiting examples, a Hall sensor, a magnetic sensor, or the like.

The second driving unit may be provided on a surface on which the second ball member 113 described below is provided, or a surface intersecting or perpendicular to the above surface.

The second frame 400 may be closely supported by inserting two (2) second ball members 113 between the first frame 300 and the second frame 400.

In an example, the second frame 400 may be provided to have a rectangular box shape because the lens module 500 is inserted therein. The first frame 300 may be provided to have a plate shape (not illustrated) opposing one side of the second frame 400 or may be provided to have a 'C' shape surrounding the one side.

Additionally, the second frame 400 may include a pair of second support portions 401 protruding from side surfaces of the second frame 400, for example, middle portions of side surfaces thereof in lateral directions, and the first frame 300 may include a pair of first support portions 301 opposing the second support portion 401 in end portions of portions surrounding the second frame 400.

The second support portion 401 and the first support portion 301 may be in close contact with each other in a state in which the second ball members 113 are inserted between planes parallel to the optical axis direction.

As described above, since the second frame 400 may be pulled by a mutual pulling force of the first magnetic body 220 and the second magnetic body 225 toward the housing 100, in a direction perpendicular to the optical axis direction, the second support portion 401 and the first support portion 301 may be supported to be in close contact with each other with the second ball member 113 interposed therebetween, in a direction perpendicular to the optical axis direction.

Additionally, the second frame 400 may rotate relative to the first frame 300, based on the second rotational axis RA2 connecting the two (2) second ball members 113 to each other.

Each of the two (2) second ball members 113 may be provided between the pair of the first support portions 301 and the second support portions 401, provided on both sides of the respective first frame 300 and second frame 400. Additionally, the two (2) second ball members 113 may form the second rotational axis RA2 that may be a rotational axis of the second frame 400.

Since the two (2) second ball members 113 may form a rotational axis, positions of the two (2) second ball members 113 may not be changed and may be rotated or fixed in place by themselves while being fixed in one place. Therefore, the second frame 400 may rotate about the second rotational axis RA2 formed by the two (2) second ball members 113.

Therefore, a guide portion (e.g., a guide portion, etc.) into which the second ball member 113 is inserted may be provided on the first support portion 301 and the second support portion 401.

A fifth guide portion 114a may be provided in the first support portion 301 of the first frame 300, and a sixth guide portion 114b may be provided in the second support portion 401 of the second frame 400, such that the second ball member 113 is inserted therein.

Since the second ball member 113, which may be spherical, may not be moved, at least one of the fifth guide portion 114a and the sixth guide portion 114b may be supported by the second ball member 113 in at least three (3) positions. In this example, the second ball member 113 may be fixedly provided to either the first frame 300 or the second frame 400, and the second ball member 113 may be provided with a guide portion that does not move to the other one of the first frame 300 or the second frame 400.

The second ball member 113 may be inserted into the guide portions 114a and 114b.

Additionally, the ball member inserted into the guide portions may maintain an accurate position inside the guide portions, for example, the second ball member 113 may only be in contact with the guide portions in three (3) positions P to maintain a supported state.

When the second ball member 113 is in contact with the guide portions at four (4) or more points, the second ball member 113 may be driven in a biased state, such as forming in only three (3) positions according to manufacturing tolerances or driving conditions of the guide portions or the ball members.

Accordingly, the guide portions 114a and 114b may be provided to have a shape in which each corner is cut in a triangular pyramid (tetrahedron) shape.

In this example, the second frame 400 and the first frame 300 may be closely supported on an inner surface of the housing 100 by attraction of the first magnetic body 220 and the second magnetic body 225 provided in the housing 100 and the second frame 400.

Since the first frame 300 is interposed between the housing 100 and the second frame 400, attraction of the first magnetic body 220 and the second magnetic body 225 may not be sufficiently strong.

Therefore, in this example, as illustrated in FIGS. 5A and 6A, a through-hole 350 or a through-groove 350 may be provided in the first frame 300, such that the second magnetic body 225 and the first magnetic body 220 may directly oppose.

Further, the second frame 400 may be provided with an extension portion 450 that protrudes in a direction, perpendicular to the optical axis direction, to pass through the through-hole 350 or the through-groove 350 to bring the second magnetic body 225 closer to the first magnetic body 220, and a second magnetic body 225 may be provided on an end portion of the extension portion 450.

Additionally, the first magnetic body 220 may be provided to be elongated in one direction, or as a plurality of the first magnetic bodies at a predetermined interval, as illustrated in FIG. 5A, or may be provided as one (1) first magnetic body, as illustrated in FIG. 6A. In this example, the second magnetic bodies 225 opposing the first magnetic body 220 may be provided as one (1) or two (2) or more of second magnetic bodies.

Additionally, the housing 100 may include the first housing 100a and the second housing 100b, and the first frame 300 and the second frame 400 may be provided to be supported by the first housing 100a of the housing 100. Of course, in this example, the first magnetic body 220 may be provided in the first housing 100a.

The first housing 100a and the second housing 100b may be coupled to each other in a direction, perpendicular to the optical axis direction. At least one of the first housing 100a and the second housing 100b may have a "C" shape to form a rectangular box shape by combining with each other.

Additionally, a stopper 150 may be provided in the second housing 100b immediately behind the second support portion 401 of the second frame 400.

In an example in which the second frame 400 is coupled to be closely supported with the first frame 300 to the housing 100, the first ball member 111 interposed between the housing 100 and the first frame 300, and the second ball member 113 interposed between the first frame 300 and the second frame 400 may be pulled only by attraction of the first magnetic body 220 and the second magnetic body 225, the first ball member 111 or the second ball member 113 may be separated, when a gap between the members is widened by an external force, other force, or the like.

To prevent this, to one surface of the first housing 100a, the first frame 300 and the second frame 400 may be sequentially coupled, and then the second housing 100b may be coupled on a side, opposing a side on which an attraction force of the first magnetic body 220 and the second magnetic body 225 acts, and the stopper 150 may be installed on the immediate rear side of the second support portion 401 at a gap smaller than a radius of a smaller ball member, among the first ball member 111 or the second ball member 113.

As illustrated in the drawings, the stopper 150 may be provided to be integrated with the second housing 100b, and may be fitted into the first housing 100a. Of course, the present disclosure is not limited thereto, and the stopper 150 may be a member separately attached to the second housing 100b.

Referring to FIGS. 7 and 8, the lens module 500 may rotate based on two axes RA1 and RA2 that intersect (vertically) with each other in the camera module, in accordance with one or more embodiments.

The first rotational axis RA1 may be formed by the rotational axis ball 111a, and the second rotational axis RA2 may be formed by the two (2) second ball members 113.

When the first frame 300 rotates based on the first rotational axis RA1, rotational driving force may be provided by a coil 213 provided on a surface of the housing 100, intersecting a surface of the housing 100 on which the rotational axis ball 111a is provided, for example, a surface of the housing 100 parallel to the first rotational axis RA1, and a magnet 211 provided on the first frame 300 to oppose the coil 213. In this example, the magnet 211 may be polarized into an N or S pole in the optical axis direction.

When the second frame 400 rotates based on the second rotational axis RA2, rotational driving force may be provided by a coil 223 provided on a surface of the housing 100, a surface intersecting a surface of the housing 100 on which the second ball member 113 is provided, for example, a surface of the housing 100 parallel to the second rotational axis RA2, and a magnet 221 provided on the second frame 400 to oppose the coil 223. In this example, the magnet 221 may be polarized into an N or S pole in the optical axis direction.

In this example, the coil 213 of the first driving unit and the coil 223 of the second driving unit may be separately provided in the first housing 100a and the second housing 100b, respectively.

Figure 9:
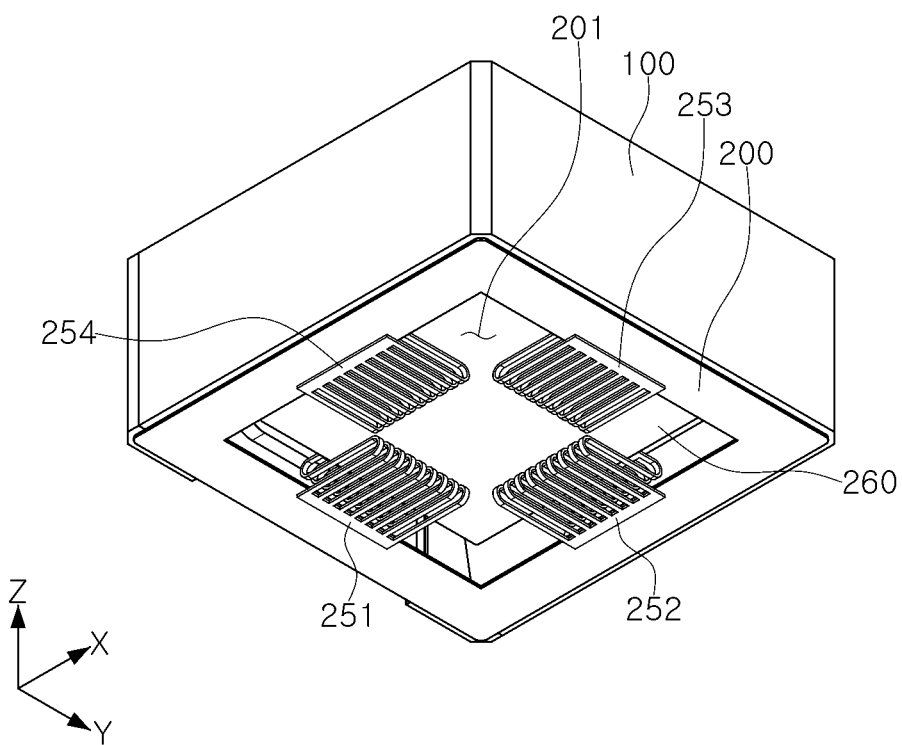
FIG. 9 is a bottom view illustrating an example camera module, in accordance with one or more embodiments.
Figure 10A:
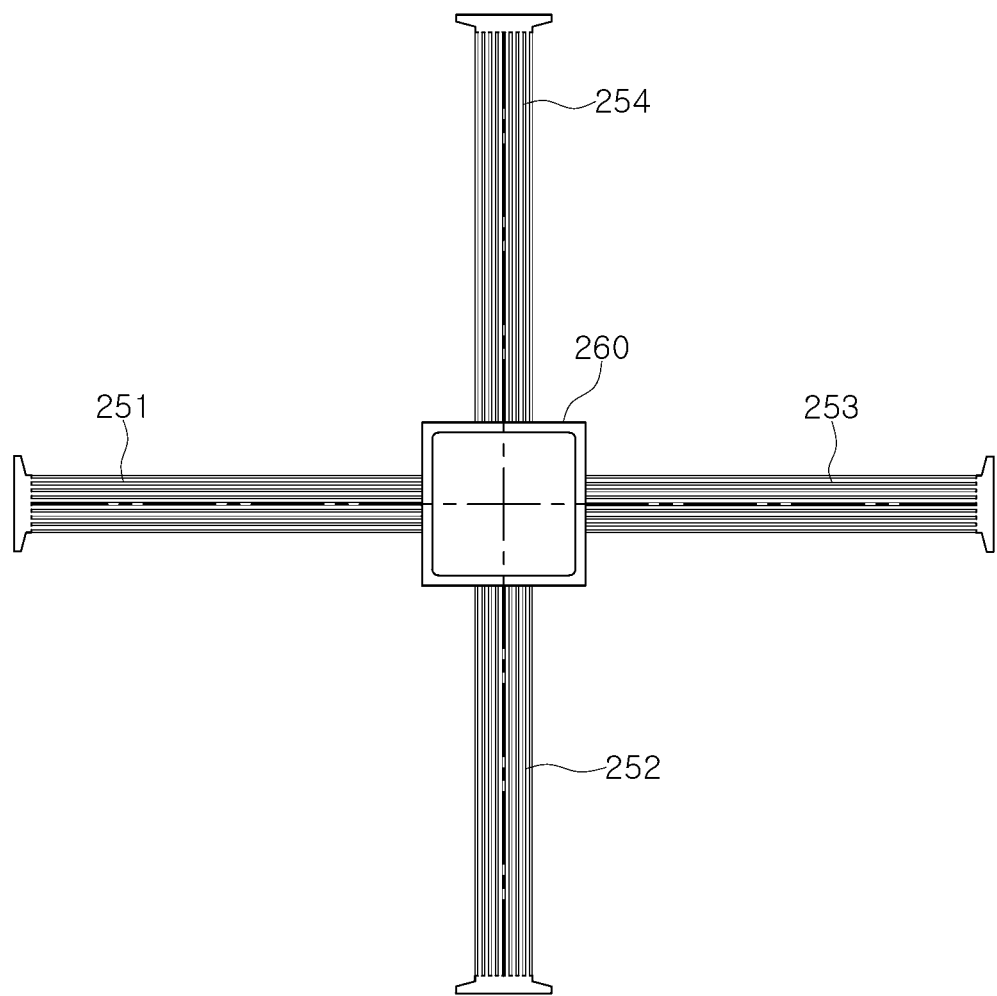
FIG. 10A is a reference view illustrating a shape in which a flexible substrate is unfolded in a sensor substrate, in accordance with one or more embodiments.
Figure 10B:
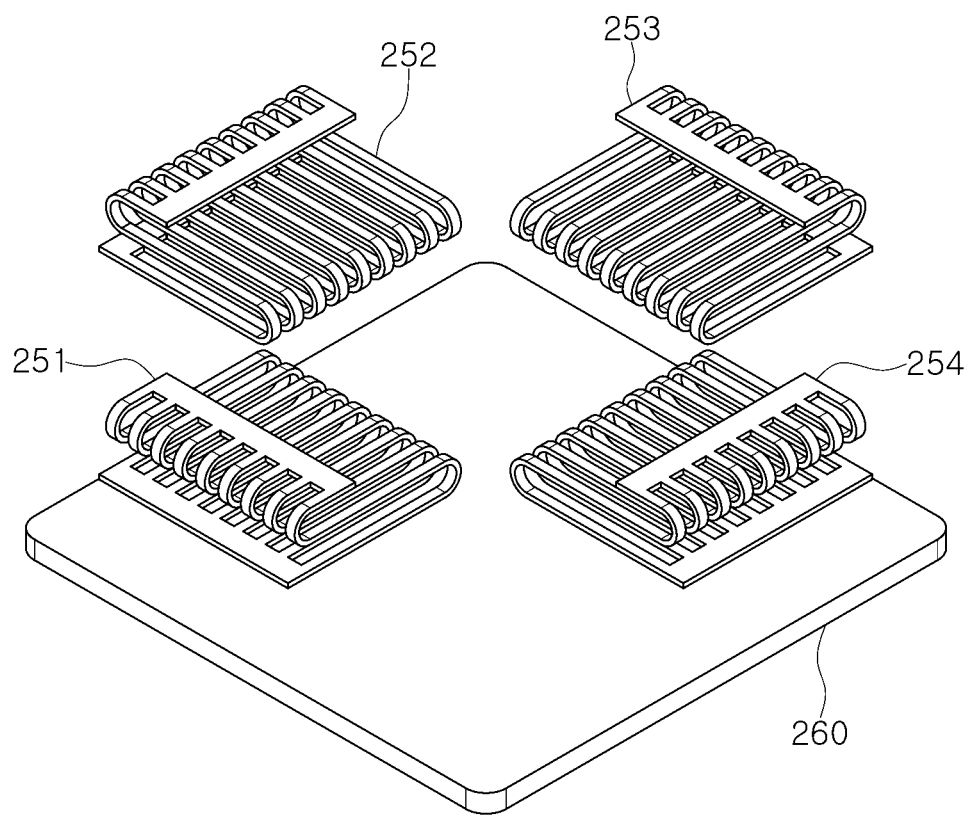
FIG. 10B is a reference view illustrating a folded shape of a flexible substrate in a sensor substrate, in accordance with one or more embodiments.
Figure 11:
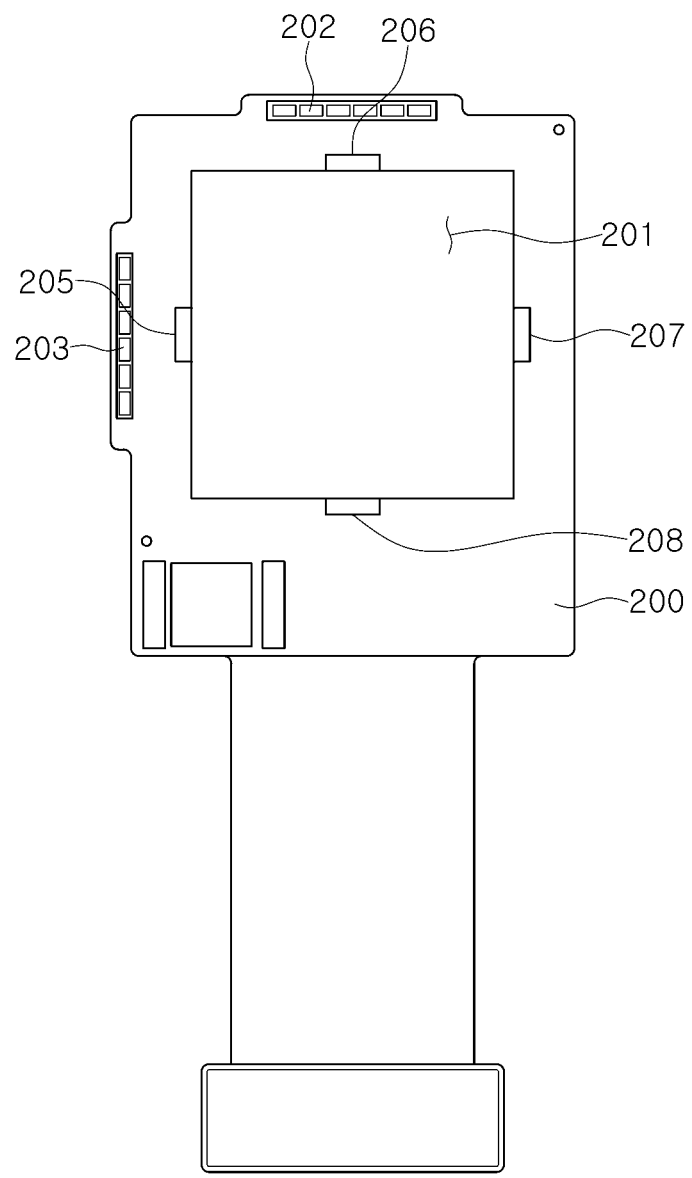
FIG. 11 is a plan view of a main substrate, in accordance with one or more embodiments.

FIG. 9 is a bottom view illustrating an example camera module, in accordance with one or more embodiments, FIG. 10A is a reference view illustrating a shape in which a flexible substrate is unfolded in a sensor substrate, in accordance with one or more embodiments, FIG. 10B is a reference view illustrating a folded shape of a flexible substrate in a sensor substrate, in accordance with one or more embodiments, and FIG. 11 is a plan view of a main substrate, in accordance with one or more embodiments.

With additional reference to FIGS. 9 to 11, a connection substrate of an example camera module 1000 of this example will be described in detail.

A lens module 500 may include a sensor substrate 260 on which an image sensor 261 is mounted. Additionally, a coil substrate that supplies power to a coil for automatic focus adjustment of the lens module 500 may be connected to the sensor substrate 260.

The sensor substrate 260 may be connected to a main substrate 200 of the camera module 1000 through the connection substrate. The connection substrate may be a flexible substrate (FPC), for example, connection substrates 251, 252, 253, and 254 may be provided to have a plurality of strands by separating at least a portion of signal lines or power lines, as illustrated in the drawings. Therefore, since each of the lines are divided into the plurality of strands, it may be easy to bend, such that movement of a second frame 400 may be sufficiently implemented.

Of course, although the connection substrates 251, 252, 253, and 254 may be separately provided, terminals may be provided on both end portions thereof, and one of the terminals may be connected to the sensor substrate 260 and the other of the terminals may be connected to the main substrate 200. Alternatively, one side of the connection substrates 251, 252, 253, and 254 may be provided to be integrated with the sensor substrate 260, and only the other side thereof may be provided with the terminals and may be then connected to the main substrate 200. In this example, when the connection substrates 251, 252, 253, and 254 are provided to be integrated with the sensor substrate 260, the connection substrates 251, 252, 253, and 254 may be provided with the sensor substrate 260 to have a stacked structure provided according to a semiconductor manufacturing process.

Additionally, the connection substrates 251, 252, 253, and 254 may be divided into four (4), for example, a first end portion thereof may be connected to four (4) sides of the sensor substrate 260 having a square shape, respectively. Further, the connection substrates 251, 252, 253, and 254 divided into four (4) may be bent several times, and then the second end portions thereof may be respectively connected to the main substrate 200. Since the connection substrates 251, 252, 253, and 254 may be divided into four (4) and connected to the four (4) sides of the sensor substrate 260, respectively, it may be easily bent, such that movement of the second frame 400 may be sufficiently implemented.

In an example, the connection substrates 251, 252, 253, and 254 divided into four (4) may be bent several times, and then the second end thereof may be connected to a lower surface of the main substrate 200 in the optical axis direction through a hollow portion 201 having a square shape. Therefore, connection substrate-connecting terminals 205, 206, 207 and 208 may be provided along an edge of the hollow portion 201 on the lower surface of the main substrate 200 in the optical axis direction. One of the connection substrate-connecting terminals 205, 206, 207, and 208 may be provided on each side forming the hollow portion 201, which may be square-shaped.

Coil substrate-connecting terminals 202 and 203 may be provided along an edge of an upper surface of the main substrate 200 in the optical axis direction.

In this example, the structure may be described as having four (4) connection substrates, but in some examples, one or two connection substrates may be provided.

Figure 12:
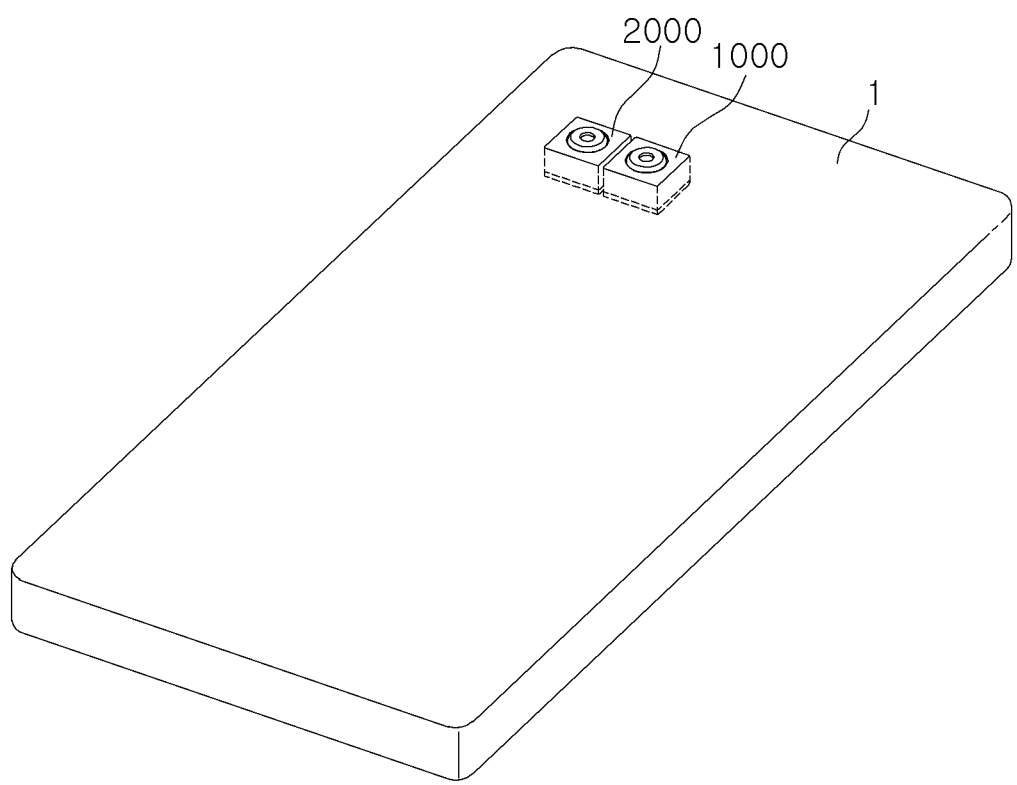
FIG. 12 is a perspective view of a portable electronic device, in accordance with one or more embodiments.
Figure 13:
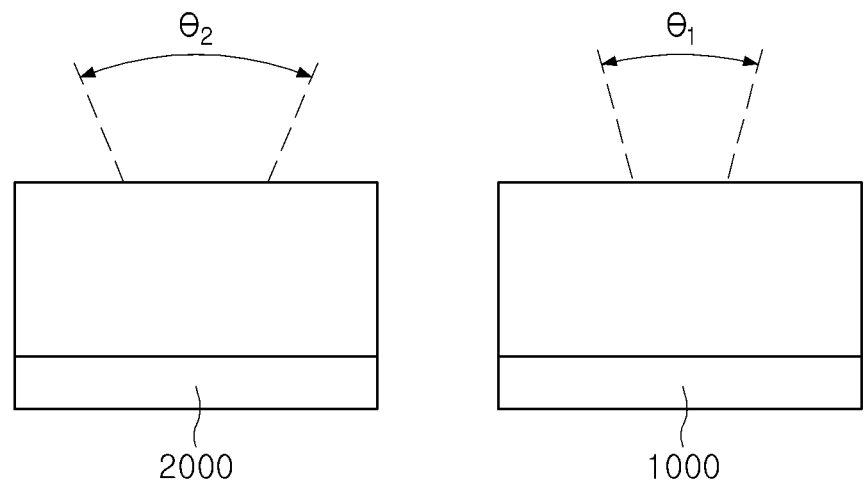
FIG. 13 is a reference view illustrating a capturing angle of view of a plurality of example camera modules mounted in an example portable electronic device, in accordance with one or more embodiments.
Figure 14:
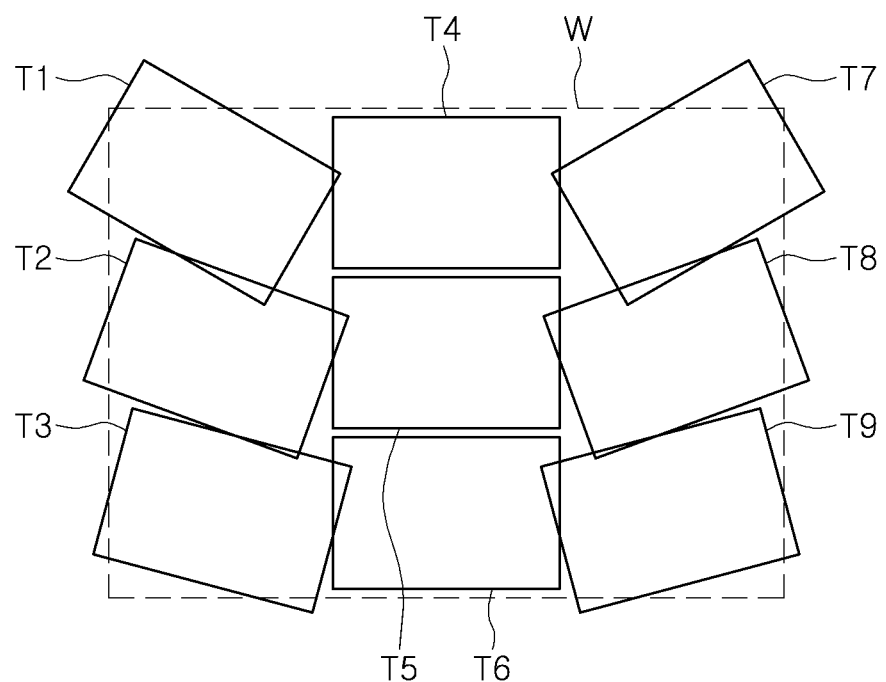
FIG. 14 is a reference view illustrating a capturing screen of a plurality of example camera modules mounted in an example portable electronic device according, in accordance with one or more embodiments.

FIG. 12 is a perspective view of an example portable electronic device, in accordance with one or more embodiments, FIG. 13 is a reference view illustrating a capturing angle of view of a plurality of camera modules mounted in an example portable electronic device, in accordance with one or more embodiments. FIG. 14 is a reference view illustrating a capturing screen of a plurality of camera modules mounted in an example portable electronic device, in accordance with one or more embodiments.

FIG. 12 is a perspective view of an example portable electronic device, in accordance with one or more embodiments. A portable electronic device 1 may be a portable electronic device such as, but not limited to, a mobile communication terminal, a smartphone, a tablet PC, or the like.

As illustrated in FIG. 12, the portable electronic device 1 may be equipped with a plurality of camera modules to capture an image of an object. In an example, the portable electronic device 1 may include a first camera module 1000 and a second camera module 2000. However, this is only an example, and at least two camera modules may be provided.

The first camera module 1000 and the second camera module 2000 may be configured to have different angles of view, for example, one of a telephoto camera and the other of a wide-angle camera. In an example, the first camera module 1000 may be configured to have a relatively narrow angle of view (e.g., a telephoto camera), and the second camera module 2000 may be configured to have a relatively wide angle of view (e.g., a wide-angle camera). Alternatively, the first camera module 1000 may be a wide-angle camera and the second camera module 2000 may be a telephoto camera.

By implementing angles of view of the two camera modules to be different from each other, as described above, an image of an object may be captured at various depths of field.

Therefore, since the camera module 1000 according to this example may implement shake correction by a structure that rotates about two (2) axes, and an image sensor rotates together with a rotating lens module 500, a focus of the camera module 1000 may be consistently maintained, and each signal line and power line may be separated into a plurality of strands, as well as the plurality of strands may be branched as four (4) strands to be sufficiently implemented so as not to affect rotational driving of the lens module 500.

As illustrated in FIG. 13, a first camera module 1000 and a second camera module 2000 may be configured to have different angles of view.

The first camera module 1000 may be configured to have a relatively narrow angle of view (e.g., a telephoto camera), and the second camera module 2000 may be configured to have a relatively wide angle of view (e.g., a wide-angle camera). In this example, the first camera module 1000 may correspond to the camera module described with reference to FIGS. 1 to 8.

In an example, an angle of view θ1 of the first camera module 1000 may be formed in the range of, as examples only, 9° to 35°, and an angle of view θ2 of the second camera module 2000 may be formed in the range of, as examples only, 60° to 120°.

By implementing angles of view of the two camera modules to be different from each other, as described above, an image of an object may be captured at various depths of field.

A portable electronic device 1, in accordance with one or more embodiments, may have a picture-in-picture (PIP) function.

In an example, the portable electronic device 1 may display an image captured by a camera module having a relatively narrow angle of view (for example, the first camera module 1000) within an image captured by a camera module having a relatively wide angle of view (for example, the second camera module 2000).

In an example, an object of interest may be captured with a relatively narrow angle of view (therefore, the object of interest may be enlarged), and the captured image of the object may be displayed in an image captured with a relatively wide angle of view.

When capturing a video, an object of interest may move. Therefore, a camera module having a relatively narrow angle of view (for example, the first camera module 1000) may be provided with a reflective module that rotates so as to follow the movement of the object of interest. Therefore, light incident on the first camera module 1000 may be reflected by a reflective member of the reflective module such that a light path may be radiated and then incident on a lens module.

In an example, the first camera module 1000 may rotate the reflection module to track the movement of the object of interest.

In an example, the reflection module provided in the first camera module 1000 may rotate based on a first rotational axis RA1 and a second rotational axis RA2. Therefore, the first camera module 1000 may correct shake that may occur during image capture.

In this example, a first rotational axis may refer to an axis perpendicular to the optical axis (the Z-axis), and a second rotational axis may refer to an axis perpendicular to the optical axis (the Z-axis) and the first rotational axis. Additionally, the first rotational axis and the second rotational axis, which may be rotation axes of the reflection module of the first camera module 1000, may intersect with the optical axis (the Z-axis), and the optical axis (the Z-axis), the first rotational axis, and the second rotational axis may meet at approximately any one point.

FIG. 14 illustrates a range of an object that may be captured using a first camera module 1000 and a second camera module 2000 installed in an example portable electronic device 1, in accordance with one or more embodiments.

The second camera module 2000 having a relatively wide angle of view may capture an object of a relatively large area, and the first camera module 1000 having a relatively narrow angle of view may capture an object of a relatively small area.

In particular, the first camera module 1000 may capture an internal area of a wide imaging range W captured by the second camera module 2000 as teleimage ranges T1 to T9, and thus, images captured as the teleimage ranges T1 to T9 may be displayed in an image captured as the wide imaging range W. Of course, the teleimage ranges T1 to T9 captured by the first camera module 1000 may capture to overlap a portion of the internal area and an external area of the wide imaging range W, or may capture the external area of the wide imaging range W.

Since the first camera module 1000 may include a reflective module that rotates about a first rotational axis and a second rotational axis, intersecting the optical axis (the Z-axis), an image captured by the first camera module 1000 may be inclined to an image captured by the second camera module 2000 by changing an imaging angle by rotation of the reflection module. This may be an example in which angles of T1 to T3 or T7 to T9, among the teleimage ranges illustrated in the reference view of FIG. 3, are changed by the rotation of the reflection module.

Therefore, in an example of an image of an object captured by T1 to T3 or T7 to T9, among the teleimage ranges captured by the first camera module 1000, the captured image may rotate to be aligned with the image captured by the first camera module 1000, to implement the PIP function.

In order to implement such a function, the camera modules 1000 and 2000 or the portable electronic devices 1 and 2 may be provided with a control unit to edit an image or implement the PIP function.

According to an example, a camera module may easily adjust shaking not only in a picture of a fixed object but also in a video of a moving object.

According to an example, a camera module may rotate at an angle wide enough to implement a tracking function when capturing a video.

According to an example, a camera module may provide a camera module that may be easily assembled by a simple structure of a driving unit and a rotational axis.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a first frame, provided in the housing; and
   a second frame, provided on the first frame, and including a lens module,
   wherein the lens module is configured to rotate together with the second frame about a first axis and a second axis, intersecting an optical axis, and
   wherein the first frame is supported on a first surface that is parallel to the optical axis and the second frame is supported on a second surface that is parallel to the optical axis and parallel to the first surface.

2. The camera module of claim 1, wherein the first frame is configured to rotate with respect to the housing about the first axis which is formed by a rotational axis ball, and
   wherein the second frame is configured to rotate with respect to the first frame about the second axis which is formed by two ball members.

3. The camera module of claim 2, wherein the rotational axis ball and the two ball members are aligned in a second axis direction, when viewed in a first axis direction.

4. The camera module of claim 2, wherein the first axis and the second axis intersect, and the rotational axis ball and the two ball members are arranged to be configured together on a plane in which the first axis and the second axis are configured.

5. The camera module of claim 2, wherein an intersection of the first axis and the second axis intersects the optical axis.

6. The camera module of claim 2, wherein the first frame is supported in the housing by the rotational axis ball and at least two guide balls.

7. The camera module of claim 1, wherein the housing and the second frame are respectively configured with a first magnetic body and a second magnetic body, and
   wherein the second frame is supported in the housing by an attraction force of the first magnetic body and an attraction force of the second magnetic body.

8. The camera module of claim 7, wherein the first frame is configured with one of a through-hole or a through-groove to directly oppose the second magnetic body provided in the second frame and the first magnetic body.

9. The camera module of claim 7, wherein the first frame is supported in the housing by a rotational axis ball and at least two guide balls, and
   wherein a center of attraction formed between the first magnetic body and the second magnetic body is provided inside a largest triangle formed by using the rotational axis ball and the at least two guide balls as vertices.

10. The camera module of claim 2, wherein the rotational axis ball and the two ball members are configured to rotate in place or maintain a fixed state.

11. The camera module of claim 1, wherein the first axis and the second axis intersect in a vertical direction, when viewed in an optical axis direction.

12. The camera module of claim 1, wherein the second frame comprises an image sensor provided below the lens module, and
wherein the image sensor is configured to rotate together with the lens module.

13. A camera module, comprising:
a first frame, supported on one surface of a housing; and
a second frame, including a lens module, and supported by the first frame in a direction facing the one surface,
wherein the first frame is configured to rotate around an axis perpendicular to the one surface and perpendicular to an optical axis,
wherein the second frame is configured to rotate around an axis parallel to the one surface and perpendicular to the optical axis, and
wherein the first frame is configured to rotate in a state in which only one side of the first frame is supported.

14. The camera module of claim 13, wherein the camera module is configured to rotate in a state in which only one side is supported by a rotational axis ball that forms a first axis between the one surface and the first frame, and
wherein the camera module is configured to rotate in a state in which two sides of the camera module are supported by two ball members that form a second axis between the first frame and the second frame.

15. The camera module of claim 14, wherein the housing comprises a first housing and a second housing, and
wherein the one surface is one side surface of the first housing, and the second housing is coupled to the first housing on a side opposing one surface of the first housing.

16. The camera module of claim 15, further comprising a plurality of coils configured to drive the first frame and the second frame,
wherein the plurality of coils are divided and provided in the first housing and the second housing.

17. A portable electronic device comprising a plurality of cameras,
wherein the plurality of cameras comprise a plurality of camera modules configured to have different angles of view,
and wherein at least one camera module of the plurality of camera modules, is the camera module of claim 1.

18. An electronic device, comprising:
one or more camera modules, each of the one or more camera modules comprising:
a shake correction unit, comprising:
a first frame, supported on a housing, and configured to rotate about a first axis perpendicular to an optical axis;
a second frame, supported on the first frame, and configured to rotate about a second axis perpendicular to the first axis and the optical axis; and
a lens module, provided in the second frame, and configured to rotate with the second frame,
wherein the first frame is supported on a first surface that is parallel to the optical axis and the second frame is supported on a second surface that is parallel to the optical axis and parallel to the first surface.

19. The electronic device of claim 18, wherein the first frame is supported on the housing by a rotational axis ball and at least two guide balls.

20. The electronic device of claim 19, wherein the rotational axis ball is fixed to one of the housing and the first frame.

21. The electronic device of claim 18, wherein opposing sides of the second frame are supported on the first frame by two ball members.

* * * * *